(12) United States Patent
Volochniuk et al.

(10) Patent No.: US 10,992,914 B2
(45) Date of Patent: Apr. 27, 2021

(54) IMAGE PROCESSING METHOD FOR PROVIDING VIRTUAL REALITY, AND VIRTUAL REALITY DEVICE

(71) Applicant: Samsung Electronics Co., Ltd, Suwon-si (KR)

(72) Inventors: Andrii Volochniuk, Kiev (UA); Oleksandr Baiev, Kharkov (UA); Jung-kee Lee, Osan-si (KR); Sun-kyung Kim, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 306 days.

(21) Appl. No.: 15/999,721

(22) PCT Filed: Apr. 26, 2016

(86) PCT No.: PCT/KR2016/004343
§ 371 (c)(1),
(2) Date: Aug. 20, 2018

(87) PCT Pub. No.: WO2017/142130
PCT Pub. Date: Aug. 24, 2017

(65) Prior Publication Data
US 2020/0329224 A1 Oct. 15, 2020

(30) Foreign Application Priority Data
Feb. 19, 2016 (KR) .................. 10-2016-0019863

(51) Int. Cl.
*H04N 13/117* (2018.01)
*H04N 13/204* (2018.01)
(Continued)

(52) U.S. Cl.
CPC .......... *H04N 13/117* (2018.05); *G06F 3/011* (2013.01); *G06T 15/205* (2013.01); *H04N 13/204* (2018.05)

(58) Field of Classification Search
None
See application file for complete search history.

(56) References Cited

U.S. PATENT DOCUMENTS 6,671,400 B1 * 12/2003 Ekpar ................. G06T 3/4038
382/157
8,913,657 B2   12/2014 Sung et al.
(Continued)

FOREIGN PATENT DOCUMENTS

KR   10-2011-0088515 A   8/2011
KR   10-2012-0016896 A   2/2012
(Continued)

OTHER PUBLICATIONS

Katkere, Arun, et al. "Towards video-based immersive environments." Multimedia Systems 5.2 (1997): 69-85. (Year: 1997).*
(Continued)

*Primary Examiner* — Ryan M Gray (57) ABSTRACT

Provided is a virtual reality (VR) device including a receiver configured to receive, from a three-dimensional (3D) camera being a polyhedron, images captured by cameras arranged at each vertex of the polyhedron; a memory storing the images; a processor configured to generate a complex view by synthesizing the images; and a display configured to display the complex view.

18 Claims, 10 Drawing Sheets

(51) Int. Cl.
  *G06F 3/01* (2006.01)
  *G06T 15/20* (2011.01)

(56) References Cited

U.S. PATENT DOCUMENTS

| | | | |
|---|---|---|---|
| 2014/0146132 A1* | 5/2014 | Bagnato | G02B 30/34 348/36 |
| 2015/0199849 A1 | 7/2015 | Cho et al. | |
| 2016/0088280 A1* | 3/2016 | Sadi | H04N 13/194 348/48 |
| 2017/0076429 A1* | 3/2017 | Russell | H04N 13/239 |
| 2018/0220070 A1* | 8/2018 | Bagnato | H04N 5/23206 |

FOREIGN PATENT DOCUMENTS

| | | |
|---|---|---|
| KR | 10-2014-0146889 A | 12/2014 |
| KR | 10-2015-0027651 A | 3/2015 |
| WO | 2015/155406 A1 | 10/2015 |

OTHER PUBLICATIONS

Supplementary European Search Report dated Dec. 7, 2018 in connection with European Patent Application No. 16 89 0722, 8 pages.
ISA/KR, "International Search Report and Written Opinion of the International Searching Authority," International Application No. PCT/KR2016/004343, dated Nov. 8, 2016, 25 pages.

* cited by examiner

POSITION MOVEMENT FROM A TO B

IMAGE PROCESSING METHOD FOR PROVIDING VIRTUAL REALITY, AND VIRTUAL REALITY DEVICE

CROSS-REFERENCE TO RELATED APPLICATIONS AND CLAIM OF PRIORITY

This application is a 371 of International Application No. PCT/KR2016/004343 filed Apr. 26, 2016, which claims priority to Korean Patent Application No. 10-2016-0019863 filed Feb. 19, 2016, the disclosures of which are herein incorporated by reference in their entirety.

BACKGROUND

1. Field

The present disclosure relates to an image processing method and a virtual reality (VR) device for providing VR.

2. Description of Related Art

Devices providing a three-dimensional (3D) image to a user by using a virtual reality (VR) device have been recently developed. VR devices can sense a movement of a user and can provide a changed image according to a movement of the user.

A 3D camera that captures a 3D image is needed to provide the 3D image to the user. 3D cameras capture an image according to the movement of the user within a space, and store the captured image. Because 3D cameras should capture and store an image every time a user moves, the 3D cameras should include a storage space.

SUMMARY

Provided are an image processing method and a virtual reality (VR) device for providing VR.

According to an aspect of the present disclosure, a virtual reality (VR) device includes a receiver configured to receive, from a three-dimensional (3D) camera being a polyhedron, images captured by cameras arranged at each vertex of the polyhedron; a memory storing the images; a processor configured to generate a complex view by synthesizing the images; and a display configured to display the complex view.

According to an aspect of the present disclosure, an image processing method for providing VR includes receiving, from a 3D camera being a polyhedron, images captured by cameras arranged at each vertex of the polyhedron; generating a complex view by synthesizing the images; and displaying the complex view to a user.

Virtual reality (VR) may be provided to a user by using images captured by a two-dimensional (2D) camera positioned at each vertex of a polyhedron.

A three-dimensional (3D) image may be generated using only images captured at non-overlapping positions.

DETAILED DESCRIPTION

Embodiments now will be described more fully hereinafter with reference to the accompanying drawings.

Figure 1:
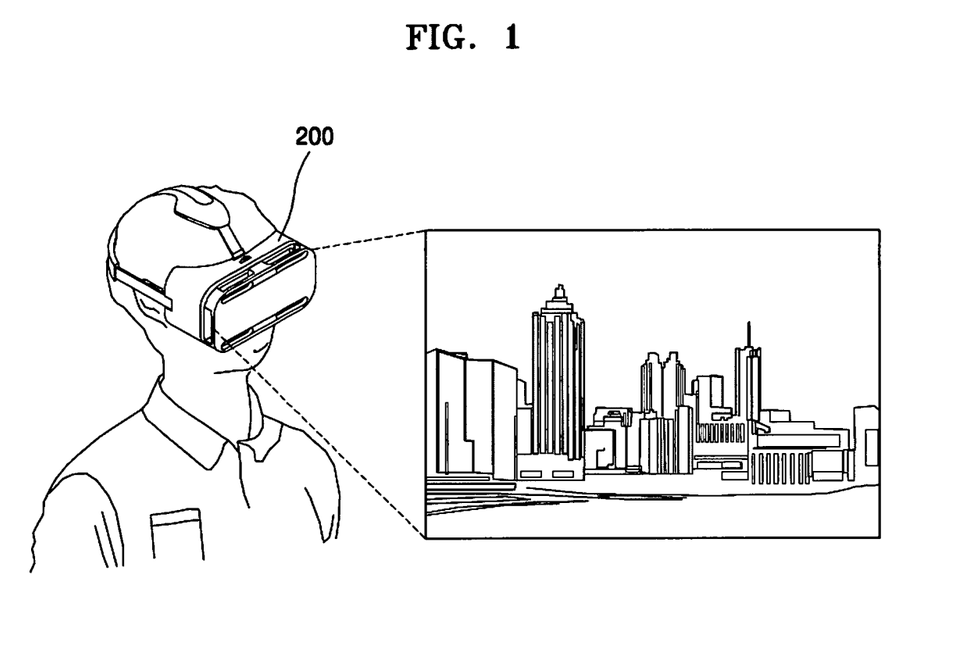
FIG. 1 is a diagram for explaining an example of virtual reality (VR).

FIG. 1 is a diagram for explaining an example of virtual reality (VR). Referring to FIG. 1, a user wears a VR device 200. The VR device 200 provides the user with an image of a space different from a space where the user is present. For example, the user may wear the VR device 200 indoors, and the VR device 200 may display a city of a foreign country.

The VR device 200 may display an image according to a movement of the user. The user may move his or her entire body or move only his or her head. When the entire body of the user moves, the VR device 200 may adjust the size of an image according to a direction in which the user moves. When the head of the user moves, the VR device 200 may display another image according to a direction in which the head of the user moves.

The VR device 200 may be referred to as a head mounted display or a headset.

Figure 2:
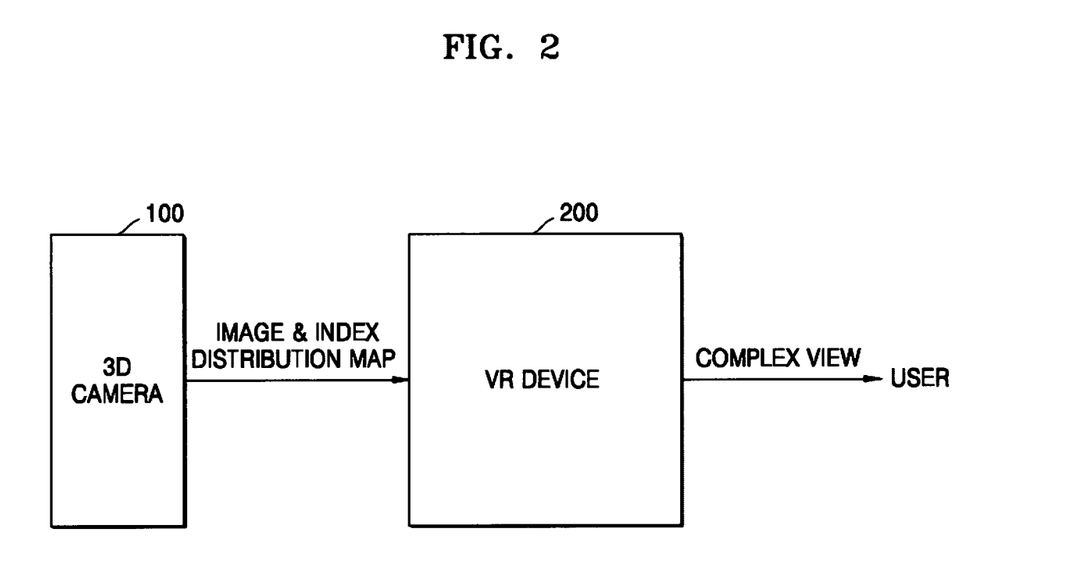
FIG. 2 is a diagram for explaining a relationship between a three-dimensional (3D) camera and a VR device.

FIG. 2 is a diagram for explaining a relationship between a 3D camera and a VR device. Referring to FIG. 2, a 3D camera 100 captures an image and transmits the captured image to the VR device 200. The 3D camera 100 transmits a position of the 3D camera 100 when capturing an image, positions of vertexes of the 3D camera 100, and an index to the VR device 200. The index represents a virtual polyhedron formed by the vertexes. The index may be a combination of symbols, characters, or numbers for identifying the virtual polyhedron. The 3D camera 100 may generate an index distribution map including indexes and positions of vertexes, and may transmit the index distribution map to the VR device 200.

The 3D camera 100 may generate the index distribution map and store the generated index distribution map in a memory. The index distribution map includes a unique index and the positions of the vertexes of the 3D camera 100. When the position of the 3D camera 100 is changed, the 3D camera 100 stores positions of changed vertexes of the 3D camera 100, and an index in the memory.

The 3D camera 100 stores only a unique index in the memory, and does not store any non-unique index. The unique index is an index that does not belong to another index stored in the memory. In other words, an index represents a virtual polyhedron, and polyhedrons may overlap each other. Indexes representing non-overlapping polyhedrons are unique indexes, and only the unique indexes may be stored in the memory. For example, when a first polyhedron does not overlap a second polyhedron stored in the memory, an index representing the first polyhedron is a unique index. The 3D camera 100 stores only an image captured at a position indicated by the unique index, in the memory. When the position of the 3D camera 100 is changed, the 3D camera 100 updates the index distribution map. The 3D camera 100 determines whether the position of the index is unique, and updates the index distribution map only when the index is a unique index. The index distribution map represents a position relationship between unique indexes.

The 3D camera 100 transmits the index distribution map and images to the VR device 200.

The VR device 200 receives the images and the index distribution map from the 3D camera 100. The VR device 200 generates a complex view by using the images and displays the complex view to the user.

The VR device 200 determines the complex view according to a position of the user. The VR device 200 searches for an index closest to a current position of the user or an index including the current position of the user. The VR device 200 may generate the complex view by using images captured at a found index and may display the generated complex view.

Figure 3:
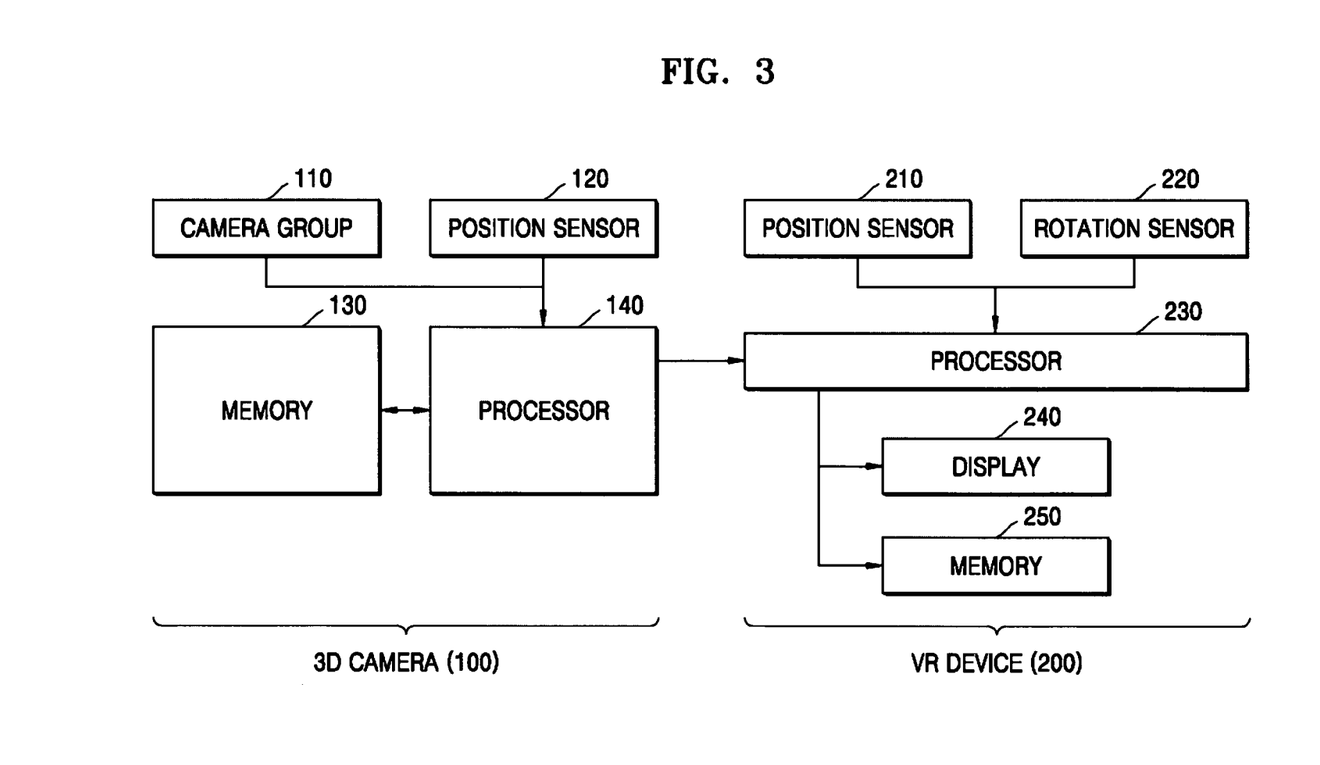
FIG. 3 is a block diagram for explaining a device and a method of providing VR, according to an embodiment.

FIG. 3 is a block diagram for explaining a device and a method of providing VR, according to an embodiment. Referring to FIG. 3, the method of providing VR includes the operations of capturing an image and providing the captured image.

The 3D camera 100 includes a camera group 110, a position sensor 120, a memory 130, and a processor 140. The camera group 110 includes a plurality of cameras. The camera group 110 is located at each of the vertexes of the 3D camera 100. The camera group 110 may include at least three cameras. Three cameras are located at a single vertex, and respective fields of view of the three cameras overlap each other. The fields of view of cameras located at the same vertex overlap each other, and the fields of view of cameras located at different vertexes also overlap each other. Overlapping portions thereof are used to generate a panorama view.

The position sensor 120 senses a position of the 3D camera 100. The position sensor 120 transmits, to the processor 140, information representing a position of the 3D camera 100 according to a movement of the 3D camera 100. For example, the position sensor 120 may be a GPS or an IMU.

The memory 130 stores an image captured by the camera group 110 and information of the position sensed by the position sensor 120.

The processor 140 receives the image from the camera group 110 and receives the position information from the position sensor 120. The processor 140 may determine an image, position information, or an index that is to be stored in the memory 130. For example, the processor 140 may store a unique image and a unique index in the memory 130. The unique image is an image captured at a location of the unique index. In other words, the unique image is an image captured by the camera group 110 at a location where polyhedrons formed by the vertexes of the 3D camera 100 do not overlap each other.

The processor 140 generates an index distribution map. The index distribution map may represent a location to which the 3D camera 100 has moved. The index distribution map includes positions of the vertexes of the 3D camera 100 and an index.

The 3D camera 100 transmits position information of the 3D camera 100 and images to the VR device 200. The 3D camera 100 may transmit the index distribution map and unique images to the VR device 200.

The VR device 200 includes a position sensor 210, a rotation sensor 220, a processor 230, a display 240, and a memory 250. The position sensor 210 senses a position of the VR device 200. The position sensor 210 transmits, to the processor 140, information representing a position of the VR device 200 according to a movement of the VR device 200. For example, the position sensor 210 may be a GPS or an IMU.

The rotation sensor 220 senses a rotation of the VR device 200. A user may wear the VR device 200 and rotate his or her head about x, y, and z axes. As the head of the user rotates, the VR device 200 also rotates. The rotation sensor 220 senses the rotation of the VR device 200 and measures an angle at which the user's head rotates about the x, y, and z axes. The rotation sensor 220 transmits the measured angle to the processor 230.

As the user moves, the processor 230 generates an image that is to be displayed to the user. The processor 230 generates the image, based on data received from the position sensor 210 and the rotation sensor 220. The processor 230 may generate the image, based on a movement direction, a movement distance, a rotation direction, and a rotation angle of the user.

The processor 230 generates a complex view by synthesizing images received from the 3D camera 100. The processor 230 selects some of the images received from the 3D camera 100 as the user moves, and generates a complex view by the selected images.

The display 240 displays the complex view generated by the processor 230.

The memory 250 stores the images and the index distribution map received from the 3D camera 100. The memory 250 may store the complex view and also store information about the movement of the user.

Figure 4:
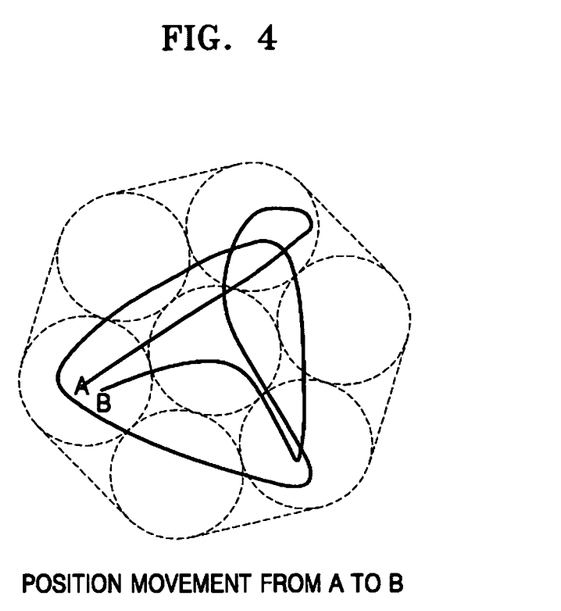
FIG. 4 is a diagram illustrating a positional movement of a 3D camera.
Figure 5:
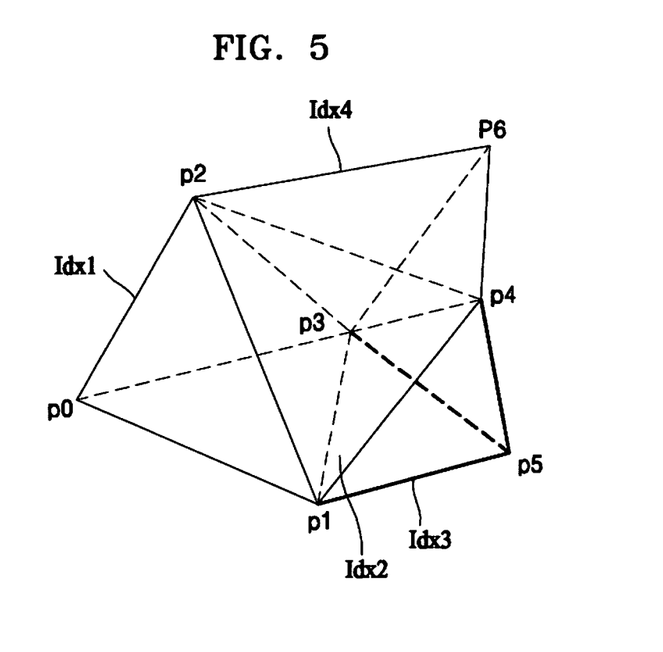
FIG. 5 is a diagram for explaining a method, performed by a 3D camera, of generating indexes.
Figure 6:
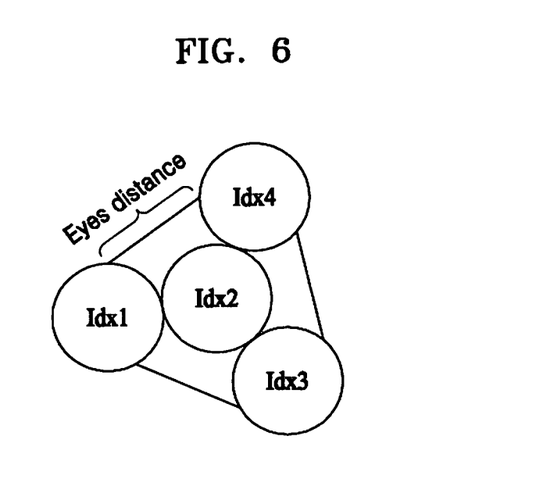
FIG. 6 is a diagram illustrating, as circles, areas covered by indexes.

FIGS. 4 through 6 are diagrams for explaining a method of generating an index distribution map, according to an embodiment. Referring to FIGS. 4 through 6, the 3D camera 100 may generate an index distribution map including only unique indexes.

FIG. 4 is a diagram illustrating a positional movement of a 3D camera. The 3D camera 100 may move along a line that connects a point A to a point B. The circles shown in FIG. 4 do not overlap each other. A new circle is generated at a location where the position of the 3D camera 100 is changed and the new circle does not overlap an existing circle. The circles indicate boundaries of images generated by the 3D camera 100.

FIG. 5 is a diagram for explaining a method, performed by a 3D camera, of generating indexes. The 3D camera 100 stores images captured at vertexes p0 through p6. The vertexes p0 through p6 may represent positions of 2D cameras. The 2D cameras may capture images when the 3D camera 100 moves from the point A to the point B. However, the 3D camera 100 may store only images captured at the vertexes p0 through p6. A distance between the vertexes p0 through p6 may be close to a distance between the two eyes of the user. For example, an average distance between the two eyes of users may be equal to the distance between the vertexes p0 through p6.

The 3D camera 100 generates indexes idx1 through idx4. Tetrahedrons represented by the indexes idx1 through idx4 do not overlap each other. A first index idx1 is an index for identifying the leftmost tetrahedron, a second index idx2 is an index for identifying a middle tetrahedron, a third index idx3 is an index for identifying a bottom right tetrahedron, and a fourth index idx4 is an index for identifying an upper left tetrahedron.

FIG. 6 is a diagram illustrating, as circles, areas covered by indexes. FIG. 6 illustrates circles corresponding to the polyhedrons of FIG. 5. The circles represent areas of images captured at positions respectively indicated by the indexes idx1 through idx4.

The circles do not overlap each other. A distance between the circles may be close to a distance between the two eyes of the user. The 3D camera 100 may store only images of a non-overlapping area, and a unique index is allocated to the non-overlapping area.

Figure 7:
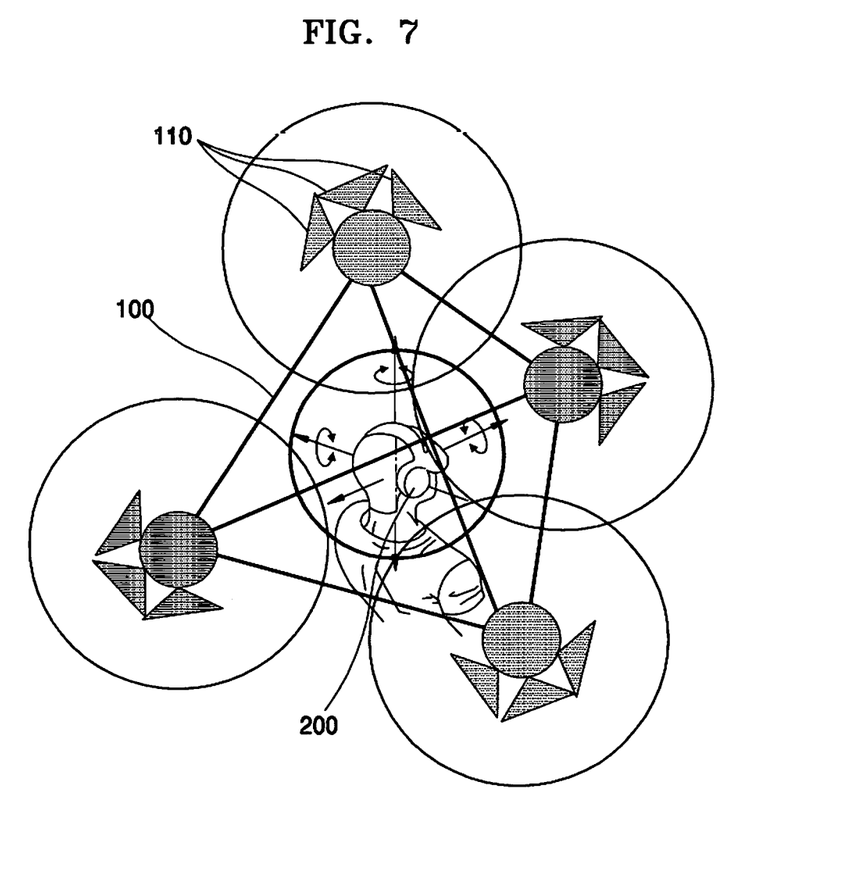
FIG. 7 is a diagram for explaining a positional relationship between a 3D camera and a VR device.

FIG. 7 is a diagram for explaining a relationship between a 3D camera and a VR device. Referring to FIG. 7, the VR device 200 is positioned within the 3D camera 100. In other words, images received from the 3D camera 100 are images captured by cameras 110 arranged outside the VR device 200. The VR device 200 determines images according to a movement or rotation of the user and generates a complex view by synthesizing the determined images.

The VR device 200 may move or rotate about x, y, and z axes. When the VR device 200 moves, the VR device 200 generates a complex view by synthesizing images captured at a movement position. When the VR device 200 rotates, the VR device 200 generates a complex view by synthesizing images captured by different cameras 110.

Figure 8:
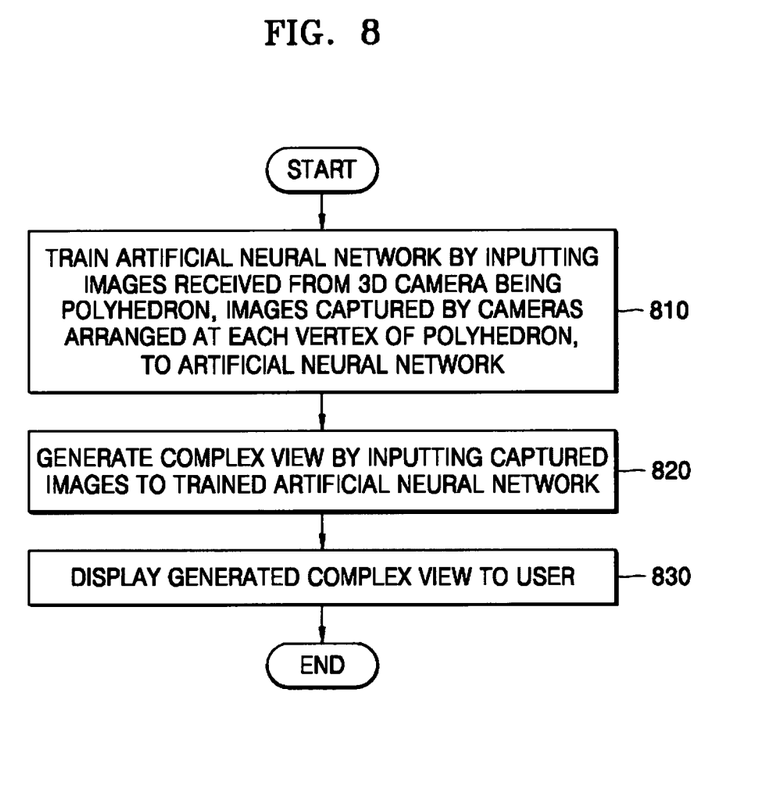
FIG. 8 is a flowchart of an image capturing method according to an embodiment.

FIG. 8 is a flowchart of an image capturing method according to an embodiment.

In operation 810, the VR device 200 receives, from the 3D camera 100 being a polyhedron, images captured by cameras arranged at each vertex of the polyhedron. The 3D camera 100 is a polyhedron such as a tetrahedron, a hexahedron, or an octahedron, and at least three cameras may be arranged at each vertex of the polyhedron. Cameras arranged at the same vertex may be referred to as a camera group.

The VR device 200 receives, from the 3D camera 100, an index distribution map representing a position of the 3D camera 100 when an image is captured. The index distribution map represents positions of the 3D camera 100 that do not overlap each other.

In detail, the VR device 200 determines a position of the VR device 200 from the index distribution map, determines images captured at the position of the VR device 200, and generates a complex view by synthesizing the determined images. The VR device 200 determines a unique index corresponding to the position of the VR device 200 from the index distribution map. The VR device 200 generates a complex view by synthesizing images captured at the determined index. Because the determined index represents a polyhedron, the VR device 200 determines a polyhedron including the VR device 200, and generates a complex view by synthesizing images captured at a position of the determined polyhedron.

For example, the VR device 200 may select the images by determining a position and a direction that are closest to a position and a direction of the VR device 200 from the index distribution map, based on the position and rotation of the VR device 200. The VR device 200 may determine an index according to a position of the VR device 200 and may determine a vertex according to a direction of the VR device 200. The VR device 200 selects images captured at the determined index and the determined vertex.

In operation 820, the VR device 200 generates a complex view by inputting the captured images to a trained artificial neural network. The VR device 200 may generate a 3D image by synthesizing 2D images by using an artificial neural network. The VR device 200 trains the artificial neural network by inputting an image to the artificial neural network. The artificial neural network includes at least one layer and includes a weight between layers. Training the artificial neural network means updating the weight. The VR device 200 initializes the artificial neural network and trains the artificial neural network to thereby prepare for a trained artificial neural network. The complex view represents a 3D image displayed to a user.

The VR device 200 generates the complex view by interpolating images according to a position of the eyes of the user. The VR device 200 determines two interpolation positions for generating an intermediate view. The VR device 200 generates an intermediate view at the interpolation positions by interpolating the images, and generates a complex view by using the intermediate view.

The VR device 200 may further include the position sensor 210 for sensing the position of the VR device 200, and the rotation sensor 220 for sensing the rotation of the VR device 200. The VR device 200 may select an image captured by the 3D camera 100, based on the position and the rotation of the VR device 200. For example, the VR device 200 may select an image by determining a position and a direction that are closest to a position and a direction of the VR device 200 from the index distribution map, based on the position and rotation of the VR device 200. Every time the VR device 200 moves, the VR device 200 may determine an index including the VR device 200 and may select an image captured at the determined index. Every time the VR device 200 rotates, the VR device 200 may select an image according to a direction in which the VR device 200 heads.

In operation 830, the VR device 200 displays the generated complex view to the user. The VR device 200 may display a special complex view to two eyes of the user.

Figure 9:
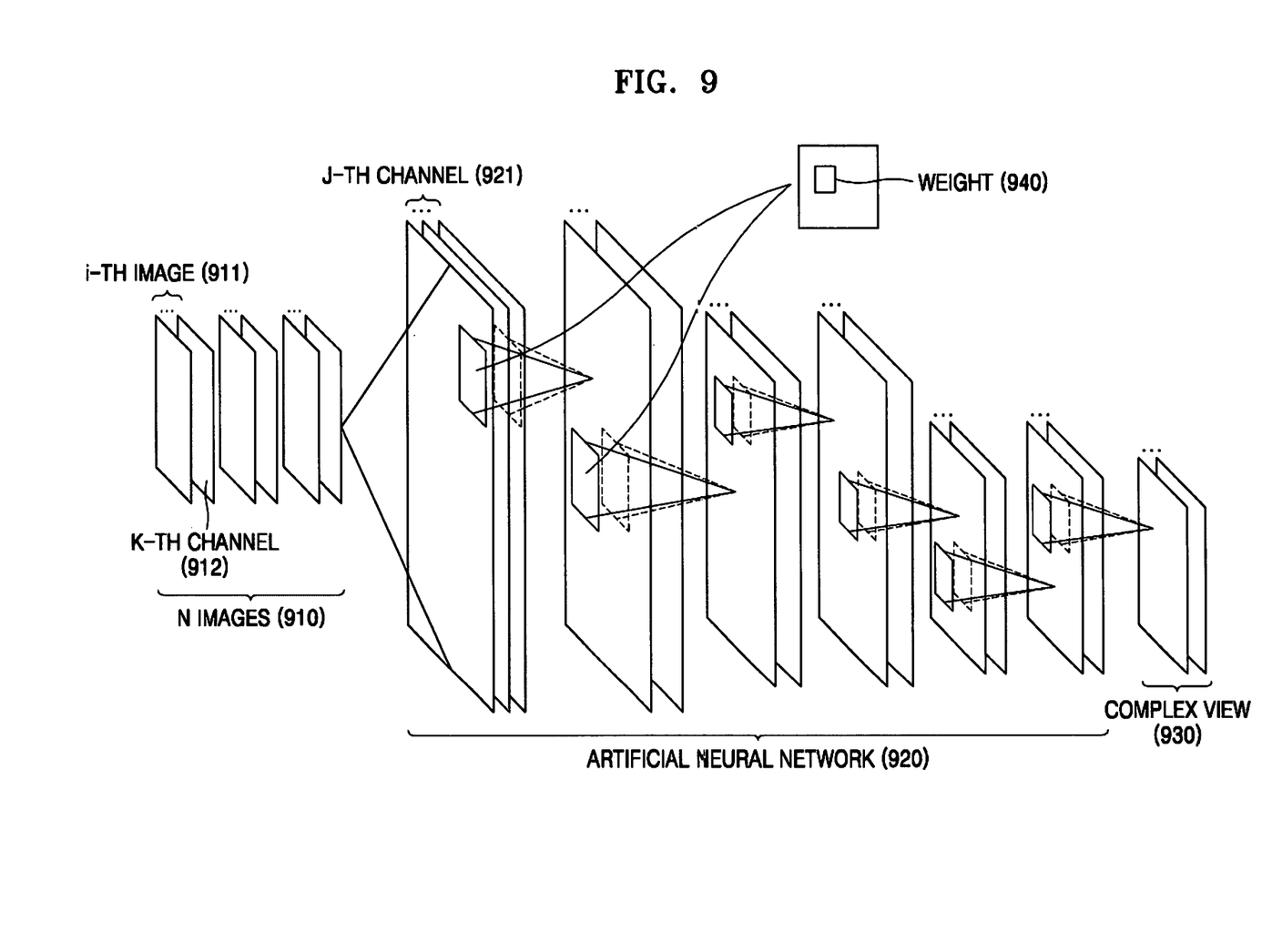
FIG. 9 is a schematic diagram for explaining a method of generating a complex view by using an artificial neural network, according to an embodiment.

FIG. 9 is a schematic diagram for explaining a method of generating a complex view by using an artificial neural network, according to an embodiment.

The VR device 200 inputs N images 910 to an artificial neural network 920. The images 910 are images selected according to a position of the VR device 200 from among images captured at each vertex of the 3D camera 100. An i-th image 911 includes at least three channels R, G, and B.

The artificial neural network 920 includes a plurality of layers, and includes weights 940 connecting the layers to each other. The weights 940 may be updated. The VR device 200 may generate a complex view 930 by inputting the N images 910 to the artificial neural network 920. The complex view 930 may be a 3D image, and the complex view 930 output by the artificial neural network 920 may be in a one-dimensional (1D) form.

Figure 10:
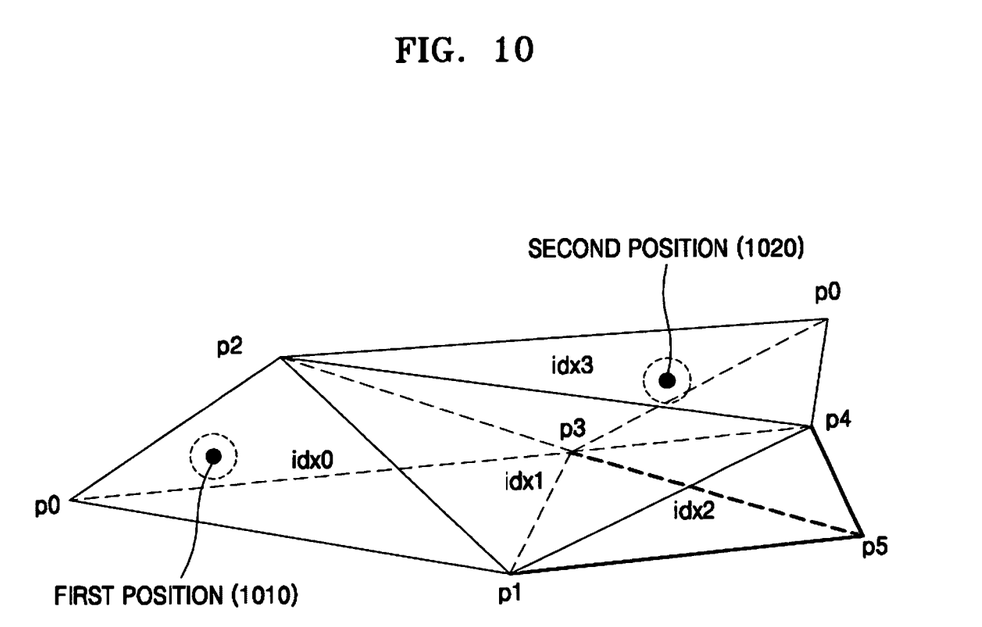
FIG. 10 is a diagram for explaining a method of determining an index according to a position of a VR device.

FIG. 10 is a diagram for explaining a method of determining an index according to a position of a VR device. The VR device 200 is at a first position 1010, and the first position 1010 is included in a polyhedron formed by four vertexes po, p1, p2, and p3. An index of the polyhedron including the first position 1010 is idx0. Accordingly, the VR device 200 receives, from the 3D camera 100, images captured at the four vertexes po, p1, p2, and p3, and generates a complex view by synthesizing the received images.

The VR device 200 is at a second position 1020, and the second position 1020 is included in a polyhedron formed by four vertexes p2, p3, p4, and p6. An index of the polyhedron including the second position 1020 is idx3. Accordingly, the VR device 200 receives, from the 3D camera 100, images captured at the four vertexes p2, p3, p4, and p6, and generates a complex view by synthesizing the received images.

Figure 11:
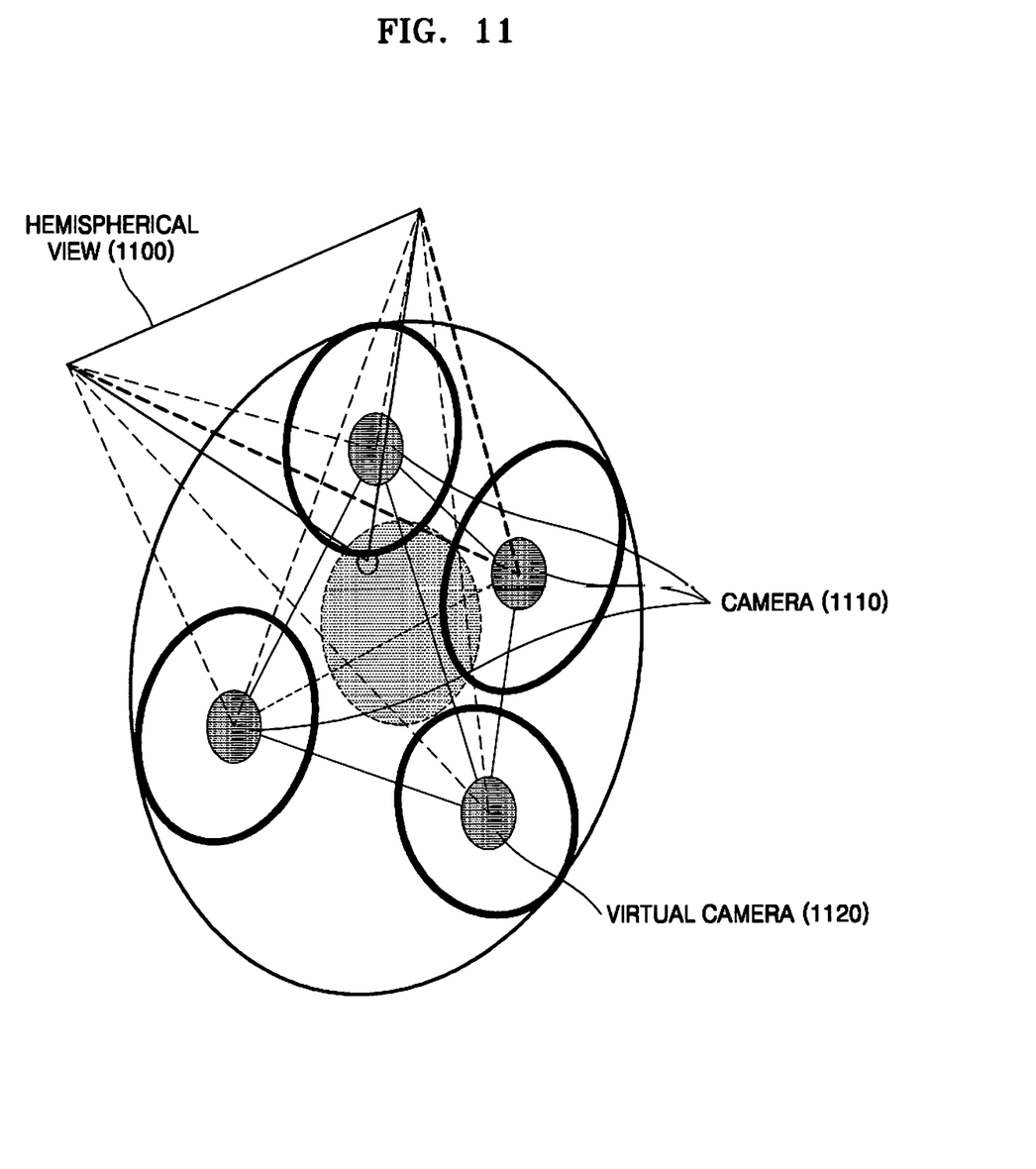
FIG. 11 is a diagram for explaining a method of generating a hemispherical view, according to an embodiment.

FIG. 11 is a diagram for explaining a method of generating a hemispherical view, according to an embodiment. Referring to FIG. 11, the VR device 200 may generate a hemispherical view 1100 by using cameras 1110 and 1120, namely, cameras 1110 and a virtual camera 1120, positioned at each vertex. FIG. 11 explains a method of generating a hemispherical view according to a direction of a right eye from among the two eyes of a user.

The cameras 1110 and the virtual camera 1120 perform photography in the outer direction of a polyhedron. Accordingly, the cameras 1110 may perform photography in a direction of the eyes of the user, and the virtual camera 1120 may not perform photography in the direction of the eyes of the user.

The VR device 200 generates the hemispherical view 1100 by synthesizing images captured by the cameras 1110.

Figure 12:
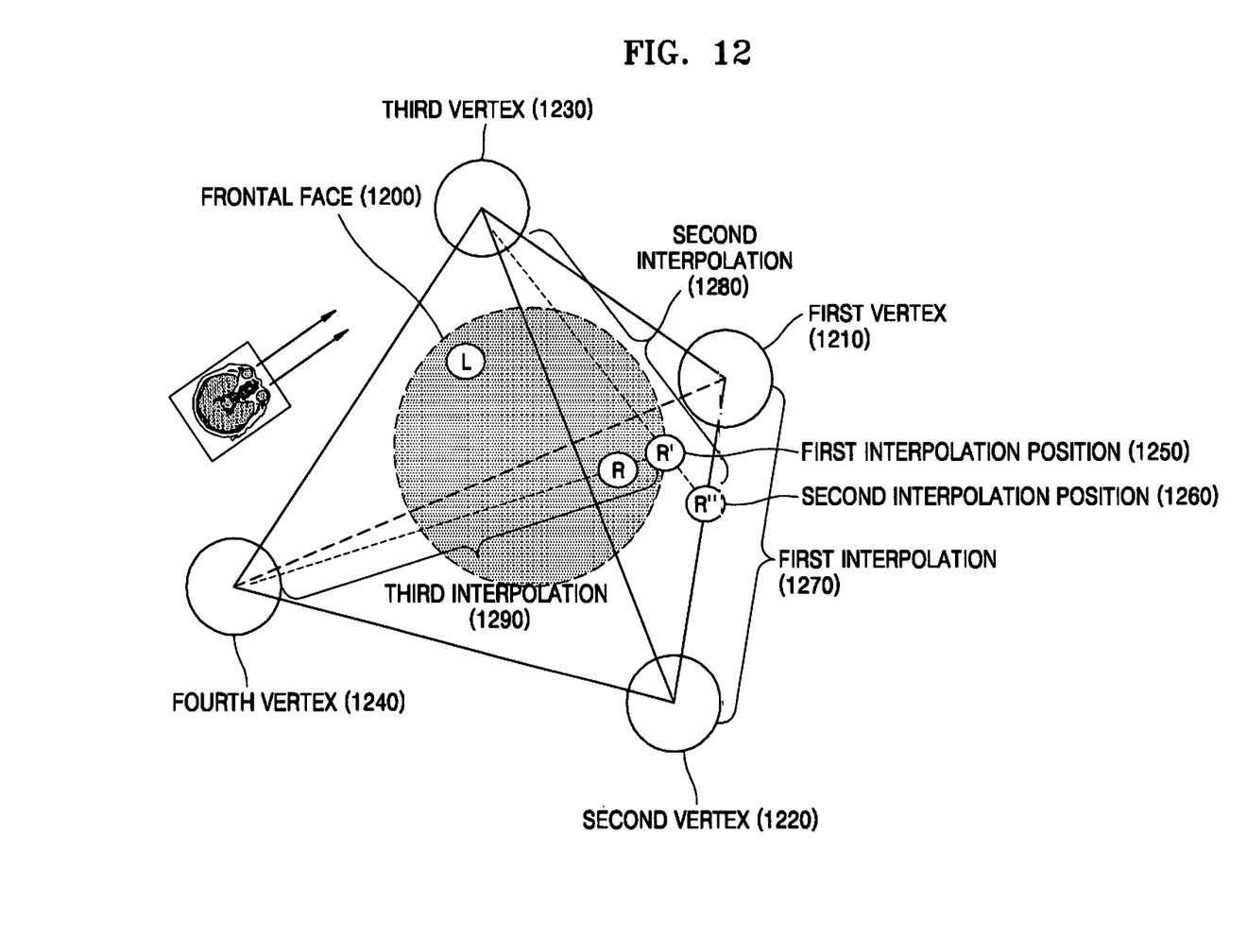
FIG. 12 is a diagram for explaining a method of performing interpolation, according to an embodiment.

FIG. 12 is a diagram for explaining a method of performing interpolation, according to an embodiment. FIG. 12 illustrates when a user views a first vertex 1210. In FIG. 12, the first vertex 1210, a second vertex 1220, and a third vertex 1230 are positioned on a side viewed by the user. Accordingly, the first through third vertexes 1210 through 1230 may be referred to as frontal vertexes.

A first interpolation position (R') 1250 is a point where a frontal face 1200 viewed by the user intersects with a ray from a back vertex 1240, namely, a fourth vertex 1240, passing through a right eye R of the user.

A second interpolation position (R") 1260 is a point where an extension of the third vertex 1230 and the first interpolation position 1250 meets an edge between the first vertex 1210 and the second vertex 1220.

The VR device 200 generates a first intermediate view at the second interpolation position 1260 by interpolating images captured at the first vertex 1210 and the second vertex 1220. The VR device 200 generates a second intermediate view at the first interpolation position 1250 by interpolating an image captured at the third vertex 1230 and the first intermediate view. The VR device 200 generates a view at the right eye R of the user by interpolating an image captured by the fourth vertex 1240 and the second intermediate view.

Figure 13:
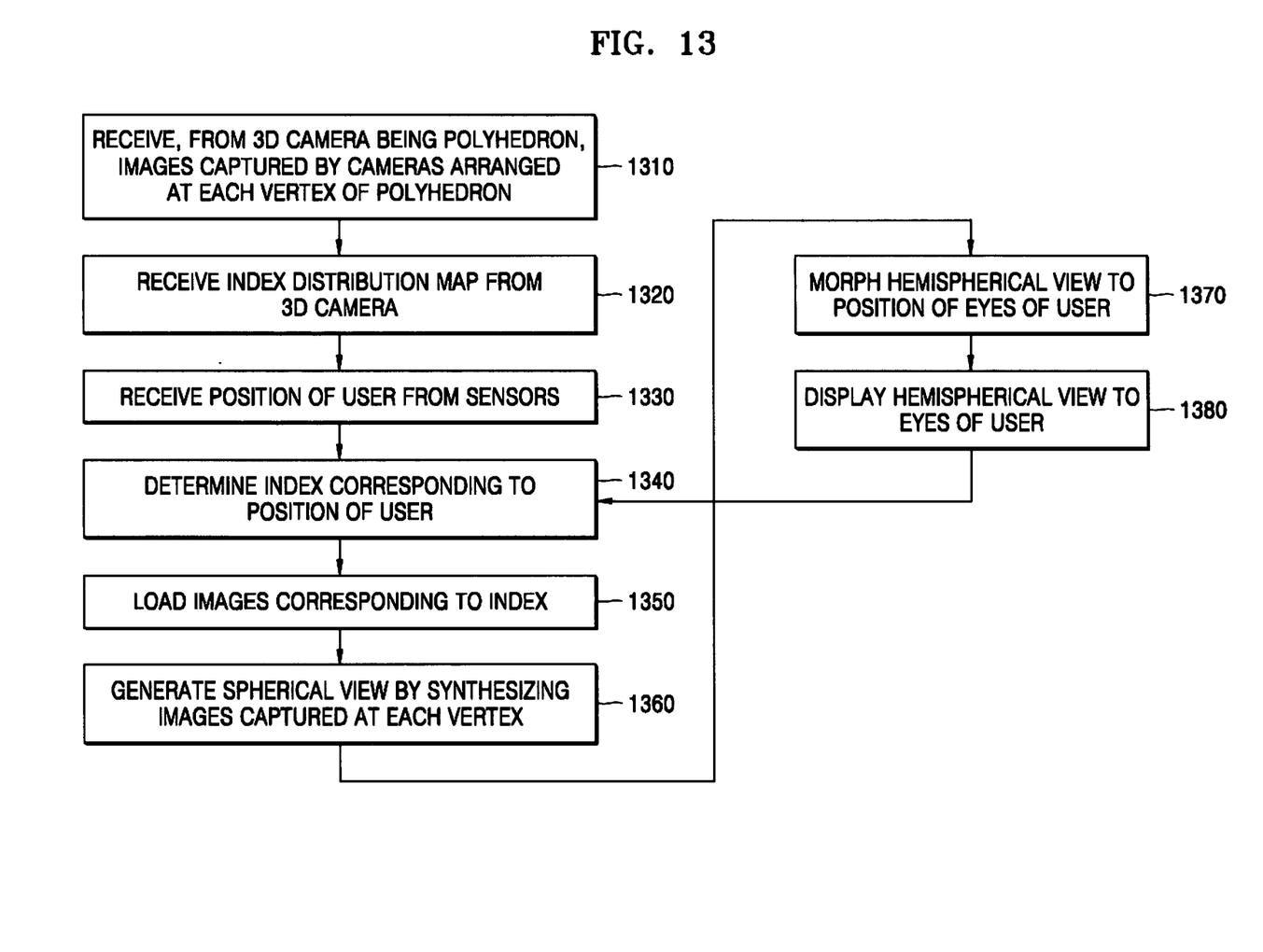
FIG. 13 is a flowchart of an image capturing method according to an embodiment.

FIG. 13 is a flowchart of an image capturing method according to an embodiment.

In operation 1310, the VR device 200 receives, from the 3D camera 100 being a polyhedron, images captured by cameras arranged at each vertex of the polyhedron. The VR device 200 stores the images in the memory 250.

In operation 1320, the VR device 200 receives an index distribution map from the 3D camera 100. The VR device 200 stores the index distribution map in the memory 250. The VR device 200 stores information representing a relationship between the index distribution map and the images, in the memory 250. Accordingly, positions where the images are respectively captured may be displayed on the index distribution map.

In operation 1330, the VR device 200 receives a position of a user from sensors. The VR device 200 includes the position sensor 210 and the rotation sensor 220. Accordingly, the VR device 200 may sense a movement or rotation of the VR device 200 according to a movement of the user.

In operation 1340, the VR device 200 determines an index corresponding to a position of the user. In other words, the VR device 200 determines a unique index, and the unique index is a symbol for identifying a polyhedron. The VR device 200 determines a position of the user according to a movement of the user received from the position sensor 210 and the rotation sensor 220, and determines an index including the position of the user.

In operation 1350, the VR device 200 loads images corresponding to the index from the memory 250. The VR device 200 loads the images captured at each vertex of the polyhedron, from the memory 250.

In operation 1360, the VR device 200 generates a spherical view by synthesizing the images captured at each vertex. For example, a tetrahedron includes four vertexes, and the VR device 200 generates four spherical views.

The VR device 200 trains the artificial neural network 920 by inputting the images to the artificial neural network 920. The VR device 200 performs feed forward propagation by inputting the images to the trained artificial neural network 920. A 180×180 spherical panorama is output in a 1D form by the artificial neural network 920. The VR device 200 generates a 270×180 spherical panorama by inputting the 180×180 spherical panorama to the trained artificial neural network 920. The VR device 200 generates a 360×180 spherical panorama by inputting the 270×180 spherical panorama to the trained artificial neural network 920.

In operation 1370, the VR device 200 morphs a hemispherical view to a position of the eyes of the user. The VR device 200 searches for a hemispherical view necessary for interpolation according to the eyes of the user. The VR device 200 performs 2D interpolation of generating an intermediate view between two vertexes. The VR device 200 performs 3D interpolation including three 2D interpolation operations. The VR device 200 may perform 3D interpolation by determining two interpolation positions.

In operation 1380, the VR device 200 displays the hemispherical view to the eyes of the user. The VR device 200 may display different hemispherical views according to, for example, eye directions of the two eyes of the user. The VR device 200 determines whether a position of the user is changed, and proceeds to operation 1340.

Apparatuses according to the present embodiments may include a processor, a memory for storing program data and executing it, a permanent storage unit such as a disk drive, a communications port for handling communications with external devices, and user interface devices, including a touch panel, keys, buttons, etc. For example, when software modules or algorithms are involved, these software modules may be stored as program instructions or computer readable codes executable on the processor in a computer-readable recording medium. Examples of the computer-readable recording medium include magnetic storage media (e.g., read-only memory (ROM), random-access memory (RAM), floppy disks, hard disks, etc.), and optical recording media (e.g., CD-ROMs, or Digital Versatile Discs (DVDs)). The computer readable recording medium can also be distributed over network coupled computer systems so that the computer readable code is stored and executed in a distributive manner. This media can be read by the computer, stored in the memory, and executed by the processor.

The present embodiments may be described in terms of functional block components and various processing steps. Such functional blocks may be realized by any number of hardware and/or software components configured to perform the specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the present embodiments may be implemented with any programming or scripting language such as C, C++, Java, assembler language, or the like, with the various algorithms being implemented with any combination of data structures, objects, processes, routines or other programming elements. The functional blocks may be implemented in algorithms that are executed on one or more processors. Furthermore, the present embodiment described herein could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples and are not intended to otherwise limit the scope of the present disclosure in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of the terms "a" and "an" and "the" and similar referents in the context of describing the present disclosure (especially in the context of the following claims) are to be construed to cover both the singular and the plural. Furthermore, recitation of ranges of values herein are merely intended to serve as each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. The present disclosure is not limited to the described order of the steps. The use of any and all examples, or exemplary language (e.g., "such as") provided herein, is intended merely to better illuminate the present disclosure and does not pose a limitation on the scope of the present disclosure unless otherwise claimed. It will be apparent to one of ordinary skill in the art that numerous modifications and adaptations may be made according to design conditions or factors without departing from the accompanying claims or their equivalents.

The invention claimed is:

1. A virtual reality (VR) device comprising:
a receiver configured to receive, from a three-dimensional (3D) camera being formed by a polyhedron in which a camera group comprising at least three cameras is arranged at each vertex of the polyhedron, images captured by the camera group at a location where polyhedrons formed by vertices of the 3D camera do not overlap each other;
a memory storing the images;
a processor configured to generate a complex view by synthesizing the images; and
a display configured to display the complex view.

2. The VR device of claim 1, further comprising:
a position sensor configured to sense a position of the VR device; and
a rotation sensor configured to sense a rotation of the VR device,
wherein the processor is further configured to select the images, based on the position and the rotation of the VR device.

3. The VR device of claim 2, wherein
the receiver is further configured to receive, from the 3D camera, an index distribution map representing a position of the 3D camera when the images are captured, and
the processor is further configured to determine an index corresponding to a position of the VR device from the index distribution map, determine images captured at the index corresponding to the position of the VR device, and generate the complex view by synthesizing the determined images.

4. The VR device of claim 3, wherein the processor is further configured to select the images by determining a position and a direction that are closest to a position and a direction of the VR device from the index distribution map, based on the position and the rotation of the VR device.

5. The VR device of claim 1, wherein the processor is further configured to train a weight of an artificial neural network by inputting the images to the artificial neural network, and generate the complex view by inputting the images to the trained artificial neural network.

6. The VR device of claim 1, wherein the processor is further configured to determine two interpolation positions for generating an intermediate view, generate the intermediate view at the interpolation positions by interpolating the images, and generate the complex view by using the intermediate view.

7. An image processing method for providing virtual reality (VR), the image processing method comprising:
receiving, from a three-dimensional (3D) camera being formed by a polyhedron in which a camera group comprising at least three cameras is arranged at each vertex of the polyhedron, images captured by the camera group at a location where polyhedrons formed by vertices of the 3D camera do not overlap each other;
generating a complex view by synthesizing the images; and
displaying the complex view to a user.

8. The image processing method of claim 7, further comprising:
sensing a position of a VR device; and
sensing a rotation of the VR device,
wherein the generating of the complex view comprises selecting the images, based on the position and the rotation of the VR device.

9. The image processing method of claim 8, wherein
the receiving comprises receiving, from the 3D camera, an index distribution map representing a position of the 3D camera when the images are captured, and
the generating of the complex view comprises determining an index corresponding to a position of the VR device from the index distribution map, determining images captured at the index corresponding to the position of the VR device, and generating the complex view by synthesizing the determined images.

10. The image processing method of claim 9, wherein the generating of the complex view comprises selecting the images by determining a position and a direction that are closest to a position and a direction of the VR device from the index distribution map, based on the position and the rotation of the VR device.

11. The image processing method of claim 7, wherein the generating of the complex view comprises:
training an artificial neural network by inputting the images to the artificial neural network; and
generating the complex view by inputting the captured images to the trained artificial neural network.

12. The image processing method of claim 7, wherein the generating of the complex view comprises:
determining two interpolation positions for generating an intermediate view; and
generating the complex view by generating the intermediate view by interpolating a view at the two interpolation positions.

13. A non-transitory computer-readable recording medium having recorded thereon a computer program for operating a virtual reality (VR) device, the computer program comprising computer readable program code that, when executed by a processor of the VR device, causes the VR device to:
receive, from a three-dimensional (3D) camera being formed by a polyhedron in which a camera group comprising at least three cameras is arranged at each vertex of the polyhedron, images captured by the camera group at a location where polyhedrons formed by vertices of the 3D camera do not overlap each other;
generate a complex view by synthesizing the images; and
display the complex view to a user.

14. The non-transitory computer-readable recording medium of claim 13, further comprising program code that, when executed by the processor, causes the VR device to:
sense a position of the VR device; and
sense a rotation of the VR device,
wherein the generating of the complex view comprises selecting the images, based on the position and the rotation of the VR device.

15. The non-transitory computer-readable recording medium of claim 14, wherein:
the receiving comprises receiving, from the 3D camera, an index distribution map representing a position of the 3D camera when the images are captured, and
the generating of the complex view comprises determining an index corresponding to a position of the VR device from the index distribution map, determining images captured at the index corresponding to the position of the VR device, and generating the complex view by synthesizing the determined images.

16. The non-transitory computer-readable recording medium of claim 15, wherein the program code for generating the complex view comprises program code, that when executed by the processor, causes the VR device to select the images by determining a position and a direction that are closest to a position and a direction of the VR device from the index distribution map, based on the position and the rotation of the VR device.

17. The non-transitory computer-readable recording medium of claim 13, wherein the program code for generating the complex view comprises program code, that when executed by the processor, causes the VR device to:
train an artificial neural network by inputting the images to the artificial neural network; and
generate the complex view by inputting the captured images to the trained artificial neural network.

18. The non-transitory computer-readable recording medium of claim 13, wherein the program code for generating the complex view comprises program code, that when executed by the processor, causes the VR device to:
determine two interpolation positions for generating an intermediate view; and
generate the complex view by generating the intermediate view by interpolating a view at the two interpolation positions.

* * * * *